Sept. 28, 1943.  W. FREY ET AL  2,330,572
PRESS AND TOOL STRUCTURE FOR FORMING CAVITIES IN METAL PLATE
Filed Sept. 14, 1940  6 Sheets-Sheet 2

Inventors
Walter Frey
Paul Krekel
By: Mason & Porter

Sept. 28, 1943.  W. FREY ET AL  2,330,572
PRESS AND TOOL STRUCTURE FOR FORMING CAVITIES IN METAL PLATE
Filed Sept. 14, 1940  6 Sheets-Sheet 3

Fig. 7

Inventors
Walter Frey
Paul Krekel
By: Mason & Porter
Attorneys

Sept. 28, 1943.  W. FREY ET AL  2,330,572
PRESS AND TOOL STRUCTURE FOR FORMING CAVITIES IN METAL PLATE
Filed Sept. 14, 1940  6 Sheets-Sheet 5

Inventors
Walter Frey
Paul Krekel
By: Mason & Porter
Attorneys

Patented Sept. 28, 1943

2,330,572

UNITED STATES PATENT OFFICE 2,330,572

PRESS AND TOOL STRUCTURE FOR FORMING CAVITIES IN METAL PLATE

Walter Frey and Paul Krekel, Brandenburg-on-the-Havel, Germany; vested in the Alien Property Custodian Application September 14, 1940, Serial No. 356,882
In Germany July 17, 1939

8 Claims. (Cl. 113—46)

The invention relates generally to means for forming cavities in a metal plate and comprehends the provision of such means in which the edge of the metal plate is held while the central portion of the metal plate is pressed in.

Furthermore, the invention relates to tools and a multiple action press suitable for carrying out this generally stated purpose.

An object of the invention is to provide novel means adaptable to use in the production of particularly deep cavities or creases, namely, such cavities as cannot be produced in one single drawing or stretching operation without exceeding the yield point of the material. More particularly, the invention seeks to provide means for forming such cavities in a preliminary drawing or stretching operation in which the metal plate to be shaped is not only pre-drawn to a greater depth than that required at the deepest point of the cavity to be produced, but in which the pre-drawn cavity is also either made wider or longer, or wider and longer than the cavity to be finally produced. The object of this pre-drawing is to have sufficient material available when forming the pre-drawn cavity to the finally required dimensions so as not to exceed the yield point of the material in the redraw operation.

Another object of the invention is to provide means of the character stated in which, in re-drawing of the plate to the final dimensions, the comparatively narrow shaping die used for pre-drawing or gathering as well as the oppositely arranged final shaping die are moved simultaneously with respect to the work piece, and in which the gathering and redrawing are effected in the same press without requiring to change the tool or the tool parts.

Another object of the invention is to provide a novel tool consisting of several parts suitable for carrying out the method mentioned above, in which there are provided a work holder for the edge of the metal plate, a gathering and counter-die shiftable within this holder, a second holder for the other side of the edge of the metal plate, and a die or matrix having a larger total working surface than the counter-die and being shiftable relatively to and within this second holder, the working surface of the matrix having a cavity corresponding to the working surface of the counter-die, the horizontal projection of said cavity being considerably smaller than the horizontal projection of the total working surface of the matrix.

Another object of the invention is to provide a multiple action press especially adapted for carrying out the purposes mentioned above, whose work holder, die, and counter-die are movable, and in which the holder is engaged by two pressure cylinders or pressure cylinder systems, the added pressures of which supply the pressure required for holding the metal plate, one of which also drives the die or matrix, and in which there is provided a controllable arresting device holding the die with respect to the bolster or press table during the operation of the counter-die and permitting the subsequent operation of the die.

Another object of the invention is to provide a tool suitable for advantageously carrying out the purposes mentioned above for use in said press, and serving to produce cavities or creases which are not only comparatively deep, but also comparatively wide. In this case, a pre-drawing or gathering die, being very narrow as compared with the matrix or with the final shaping die and serving as a counter-die, would not, like the tool mentioned above, be serviceable for effecting the final shaping, because it would be narrower than the cavity to be produced. Therefore, it is the object of the invention, in this case, to provide a tool with a work holder or metal plate holder, in which a gathering die is movably mounted in the upper or the lower, or in the upper and the lower final shaping die and adapted to be driven so as to move out or to project before the final shaping die or counter-die during a gathering operation.

Another object of the invention is to provide an apparatus of the character stated wherein is included an arrangement for driving a gathering die by means of a changeable coupling together with the associated final shaping die or counter-die, and for making it movable, in the position of its gathering operation, with respect to or out of the final shaping die.

A further object of the invention is to provide novel means capable of providing oblong cavities in metal plate by shaping operations, which cavities widen out into the even portion of the metal plate.

Other objects and advantages of the invention will be apparent by reference to the following description, considered in conjunction with the accompanying drawings, in which—

Figure 1:
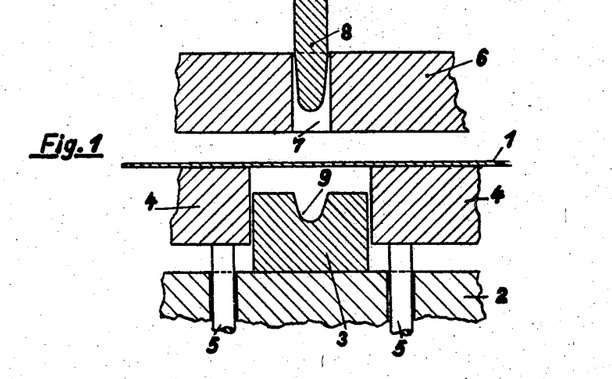
Figs. 1, 2 and 3 are enlarged fragmentary vertical cross sectional views illustrating one form of the invention, the initial placement of a metal plate being shown in Fig. 1, the plate being shown as gathered in Fig. 2, and as finally shaped in Fig. 3.
Figure 2:
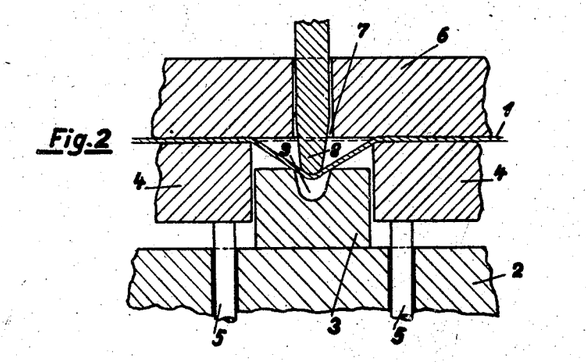
Figure 3:
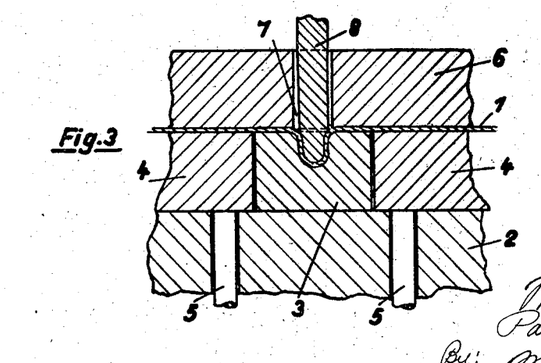

According to Figs. 1 to 3, the tool for producing a cavity or bulging in a metal plate 1 consists of the lower work holder 4, the upper work holder 6, the upper gathering or shaping die 8, and the lower final shaping die 3. The shaping die 8 constitutes a counter-die and is shiftably guided in an opening or boring 7 of the upper metal plate holder 6, and is adapted, in a manner not illustrated in the drawings, to be connected with the corresponding plunger of a press. Likewise, the upper work holder 6 may be connected with plungers or push rods or other work holder driving parts of a press.

The die or final shaping die 3 is considerably wider than the gathering die 8 and has a recess 9 corresponding exactly to the cavity to be produced in the metal plate and being a little larger than the head of the gathering die 8. Therefore, the die 3 constitutes a matrix adapted to be secured to the bolster 2 and shiftable in an opening or boring in the lower work holder 4. This work holder has plungers 5 serving to guide the holder at the bolster in upward and downward direction.

The manner in which such a tool acts within a press in carrying out the method according to the invention, is as follows:

The metal plate 1 is placed upon the lower holder 4 in the position shown in Fig. 1. Then, the upper holder 6 lowers on the metal plate preventing the latter from being shifted in lateral direction. Now, the gathering die 8 is brought out of the position of Fig. 1 into the position shown in Fig. 2, producing in the metal plate 1 a gathering in the shape of a flat V. At the end of this gathering operation, the metal plate comes into contact with the edges of the cavity 9 of the matrix 3. In this position, the distance between the matrix 3 and the upper holder 6 is chosen so that the gathering produced in the metal plate does not exceed the yield point of the material.

For producing the final cavity, the lower work holder 4 is guided downwards by the press gear, together with the upper work holder 6 and the counter-shaping and gathering die 8, until the position shown in Fig. 3 is reached, in connection with which elastic means, not illustrated in the drawings, such as springs or hydraulic means, may be provided to engage the work holder 4, in order to elastically counteract the positive lowering of the work holder 4. In this motion, the metal plate is forced quite into the recess 9, the sides of the flat V being partly moved into a vertical position and placed against the head of the shaping die 8. It should be noted that, in this downward motion, the counter-die 8 is not moved down as far as the work holders 4 and 6, differing in space as much as the depth of the gathering operation exceeds the depth of the finally desired cavity.

The width of the matrix is, depending on the depth of the gathering and the depth of the finally desired cavity with respect to the width of the gathering die, chosen so that sufficient material is bulged out in the gathering operation to prevent the yield point of the material from being exceeded in the final shaping operation, as shown in Fig. 3.

Figure 4:
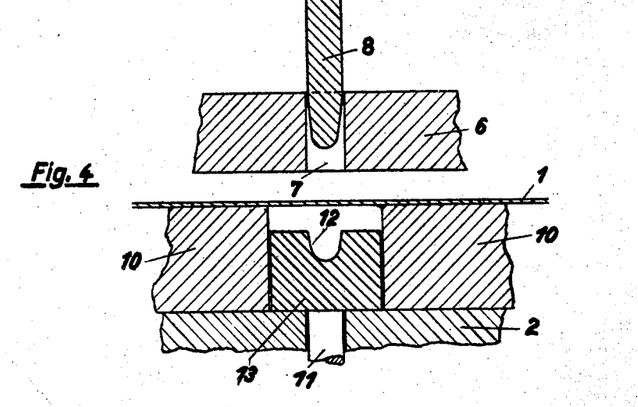
Figs. 4, 5 and 6 are views similar to Figs. 1, 2 and 3 illustrating stages of the plate shaping as performed by a modified form of the apparatus.
Figure 5:
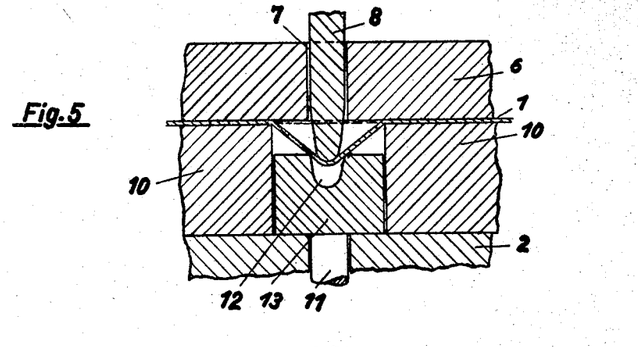
Figure 6:
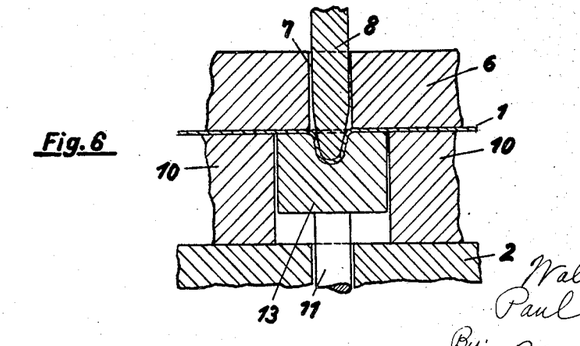

In the modified form of construction shown in Figs. 4 to 6, the tool consists of the upper work holder 6, the counter-shaping and gathering die 8 guided in the opening 7 of said holder, the lower work holder 10, and the final shaping die 13 guided in the holder 10. In distinction from the constructional forms shown in Figs. 1 to 3, the lower work holder is adapted to be rigidly secured to the bolster 2, whereas the final shaping die 13 is adapted to be guided by means of the plunger 11 in the bolster 2 in upward and downward direction. The final shaping die has a recess 12 which, as a matrix, corresponds to the head of the counter-die 8.

The manner of action differs in this constructional example from that of the examples shown in Figs. 1 to 3 as follows:

From the initial position according to Fig. 4, the position shown in Fig. 5 is reached by means of the drive, not illustrated in the drawings, of the metal plate holder 6 and of the counter-die 8, the latter position corresponding to that shown in Fig. 2. With respect to the extent of the gathering or to the distance between the die 13 and the counter-die 8, the same applies as in Figs. 1 to 3. The final shaping position according to Fig. 6 is reached by the raising of the final shaping die 13 by means of a drive, not illustrated in the drawings, whereas the counter-die 8 at the same time recedes in upward direction to the extent by which the depth of the gathering shown in Fig. 5 exceeds the depth of the finally desired cavity shown in Fig. 6. The receding of the counter-die 8 may be effected with the aid of elastical means, not illustrated in the drawings.

With respect to the width of the matrix, the same applies in Figs. 4 to 6 as in Figs. 1 to 3.

Figure 7:
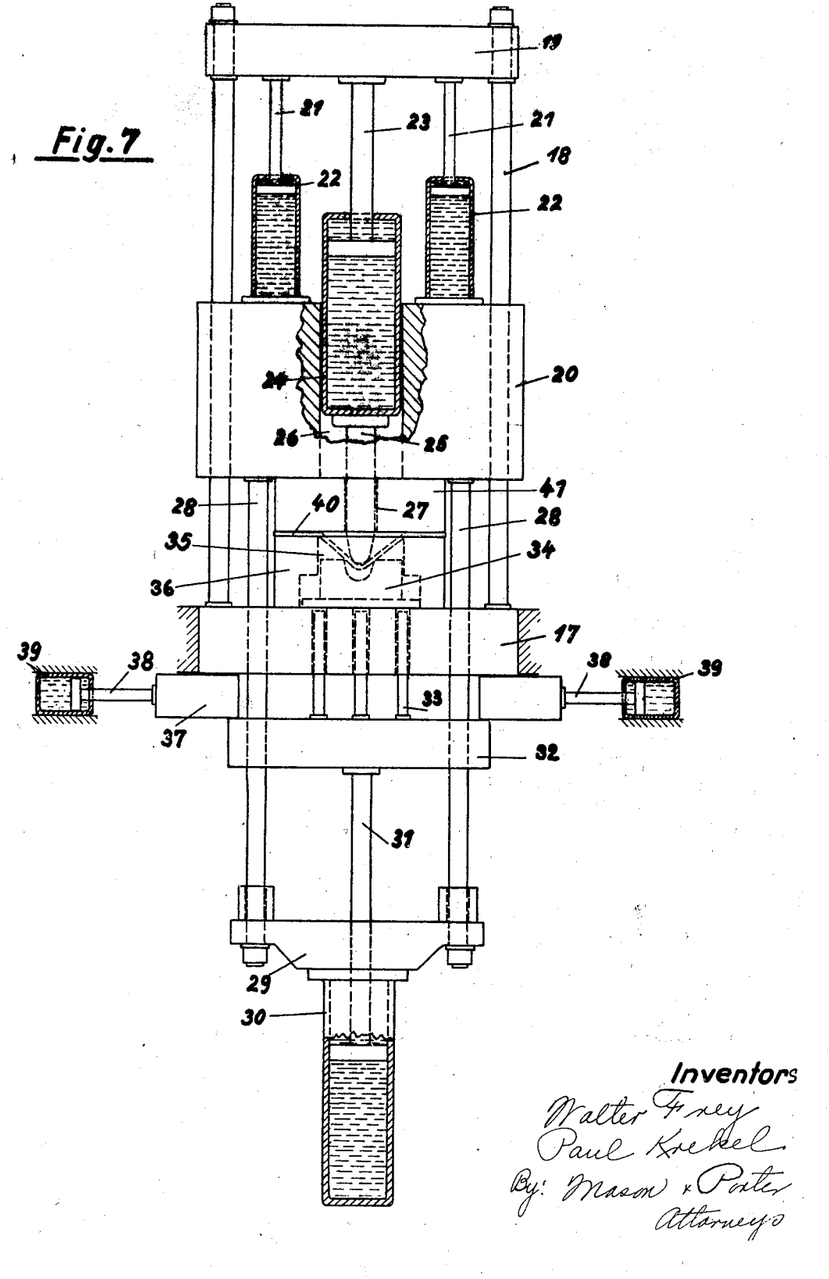
Fig. 7 is a front elevation illustrating a triple action press embodying the invention, parts being shown in vertical cross section.

Fig. 7 shows a triple action press in the operating step corresponding to that of Fig. 5 or Fig. 2.

Figure 8:
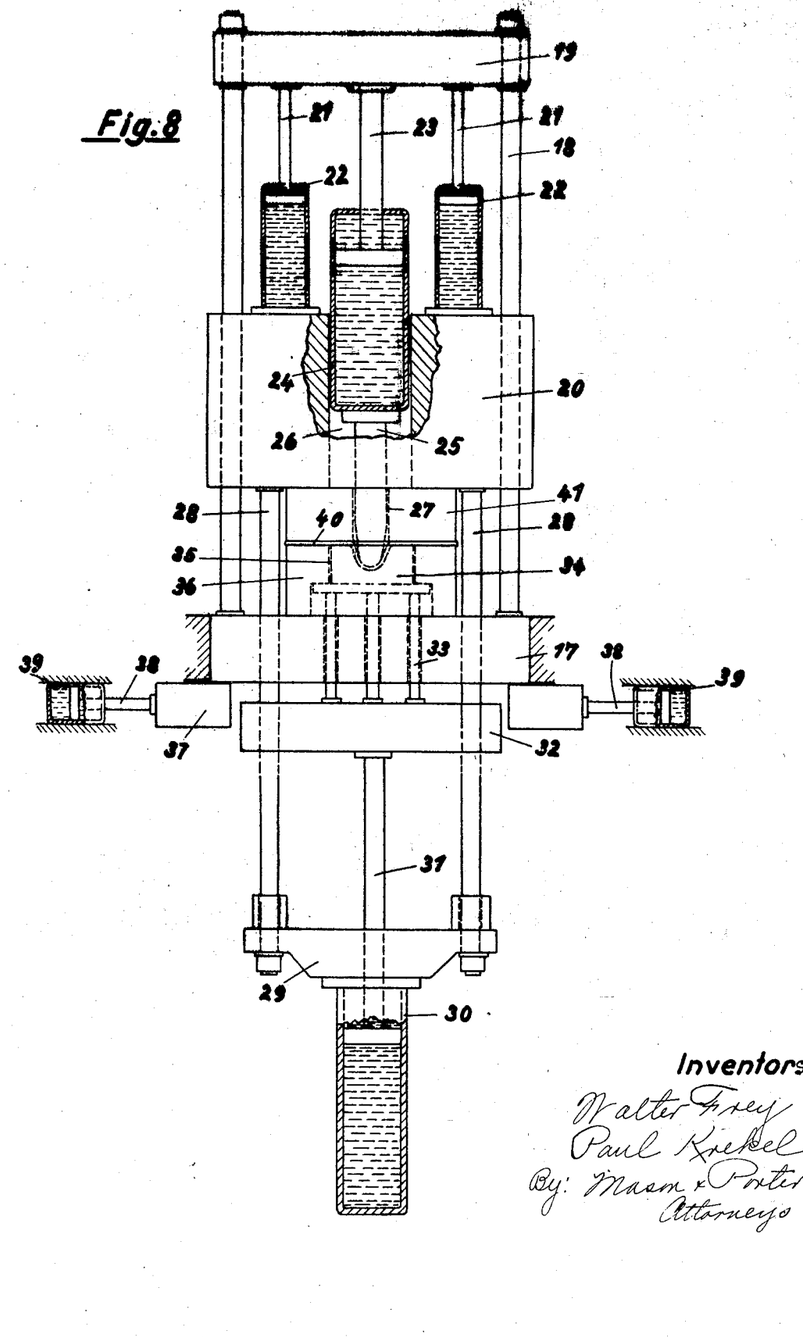
Fig. 8 is a view similar to Fig. 7, the parts being positioned to effect the completion of the plate cavity.

Fig. 8 shows the same press in an operating step corresponding to that of Fig. 3 or Fig. 6.

The bolster 17 is secured to the foundation in a manner not illustrated in the drawings. To the bolster are secured the lower free ends of the two or more guiding rods 18 which, together with the cross yoke 19 connecting their upper ends, constitute the main part of the frame of the press. The movable work holder carriage 20 is mounted on the guiding rods 18 so as to be shiftable in upward and downward direction.

To the cross yoke 19 is secured the piston rod 23 of a movable hydraulic cylinder 24 constituting the press plunger. This press plunger 24 is movably mounted within the work holder carriage 20 in a boring 26. It guides the counter-die 27 constituting the upper drawing tool and passing through a corresponding boring in the work holder 41 secured to the lower side of the work holder carriage 20.

The movable work holder carriage 20 is engaged by connecting rods 28 passing downwards through the bolster 17, their lower ends being rigidly connected by a yoke 29. The yoke 29 carries a hydraulic pressure cylinder 30 whose piston 42 is secured via the piston rod 31 to a slide 32 mounted on the guiding rods 28 so as to be movable in upward and downward direction. The slide 32 carries push rods 33 and, together with the latter, constitutes the counter-plunger. For this purpose, the push rods 33 pass through corresponding borings in the bolster 17 and engage the die 34 when the piston 42 and the slide 32 are moved upwards.

In connection with the bolster 17 there are secured to the foundation, in a manner not illustrated in the drawings, two smaller hydraulic cylinders 39, each of which guides by means of pistons and piston rods 38 a bolt or distance piece 37 capable of being inserted by shifting between the bolster 17 and the slide 32.

The metal plate 40 to be shaped is clamped between the upper work holder 41 and the lower work holder 36. For effecting this clamping, a pressure is exerted by the upper pressure cylinder 22 upon the work holder carriage 20. Besides this, an additional pressure of the movable work holder carriage 20 or of the work holder 41 respectively is exerted upon the metal plate 40 by operating the lower pressure cylinder 30 and by bringing the distance pieces 37 by means of the pressure cylinder 39 into the position shown in Fig. 7, in which they lock the motion of the slide 32 with respect to the bolster 17. Then, the pressure exerted in the pressure cylinder 30 can only pass from the cylinder wall via the yoke 29 to the connecting and guiding rods 28 and to the movable work holder carriage 20, so that this pressure is added to that already exerted by the cylinder 22 and prevents the metal plate 40 from slipping out of the work holders.

The position according to Fig. 7 is chosen so that the die 34 is at a distance from the not yet shaped metal plate 40, as shown by the continuous lines, forming a space 35. The said distance between the die 34 and the work holder 41 depends on the yielding capacity or ductility of the metal plate.

Owing to this distance, the plunger 24, after insertion of the metal plate between the work holders 41 and 36, may now be moved downwards together with the counter-die 27 so that the central portion of the metal plate will acquire the shape shown by dashed lines and will touch the die 34.

Now, the bolts 37 are drawn back by a corresponding operation of the cylinders 39 so that, owing to the pressure exerted in the cylinder 30, the slide 32 can move upwards. The push rods 33 will then move the die 34 into the position shown in Fig. 8, whereas the counter-die 27 will at the same time recede by the small space by which the gathering operation according to Fig. 4 exceeds the extent of the recess in the die. In the return movement, an elastically yielding pressure may be exerted from the cylinder 24 upon the counter-die 27. Also during this redrawing operation, the pressure exerted from the cylinder 30 upon the die 34 will at the same time be transmitted to the work holder carriage 20, in the manner described in conjunction with Fig. 7, and will be added to the pressure simultaneously exerted by the cylinder 22 upon the work holder.

The valves, pipes, and other means required to control the various hydraulic cylinders 22, 24, 30, and 39 are not illustrated in the drawings and may be constructed in usual manner. Furthermore, the tools 27, 41, 34, and 36 may be replaced by other tools. The height of the cylinders 39 and of the distance pieces 37 with respect to the slide 32 may be varied in order to correspondingly alter the position of the die 34 as required. The tools used may be those described in conjunction with Figs. 1 to 6 or the tools described hereinafter or also any other desired tools.

In any case, the construction of the press has the advantage that the driving means directly engaging the work holder, as for example the cylinders 22, may be comparatively small, because they are assisted in each operating step by the driving means of the counter-plunger, as for example the cylinder 30.

The upper and the lower parts of the press may be exchanged so that the gathering die, as for example the counter-die 27, first acts from below upon the metal plate, whereas the die, as for example the die 34, acts from above. Likewise, the movable work holder carriage may be arranged at the bottom instead of at the top and may act upon a yoke secured to the frame of the press, which yoke will, in this case, replace the bolster. But, in any case, a bolting arrangement should be provided for enabling locking of the plunger or the counter-plunger and also a transferring of the pressure of the driving cylinders upon the work holder.

The driving means, such as the cylinders 22, directly engaging the work holder, might be omitted if, for holding the metal plate as well as for the gathering operation and for the redrawing operation, the pressures exerted by the driving means of the counterplunger are sufficient. In addition, the cylinders 22 may, of course, be united in one cylinder, or the cylinders 22, 24, and 30 may be subdivided into several cylinders.

Figure 9:
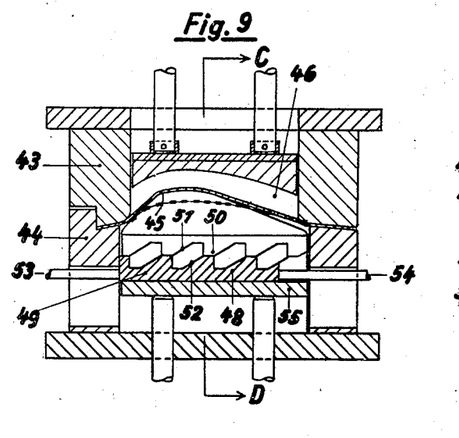
Fig. 9 is a fragmentary vertical cross section illustrating a modified form of shaping equipment, the section being taken on the line A—B of Fig. 10.
Figure 10:
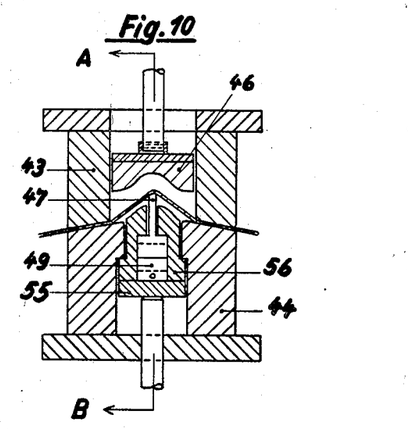
Fig. 10 shows a section on line C—D of Fig. 9.

In Figs. 9 to 12, 43 designates the upper and 44 the lower work holder for the work piece 45. In Figs. 9 and 10, the upper shaping die 46 is still in the position of rest, whereas the gathering die 47 is in its operating position. In this position, the teeth 48 of a cross bar 49 are supported on projections 50 at the bottom of the gathering die 47. The projections 50 and the teeth 48 have opposing bevelled flanks 51 and 52 and border openings corresponding to the sizes of the teeth or projections. The bar 49 has handles 53 and 54 passing through the work holder 44, by means of which handles it is possible to bring the cross bar into the position shown in Fig. 11, in which the teeth 48 are in the openings between the projections 50. The bottom of the bar 49 rests upon the lower plunger 55 which, in Fig. 10, also carries the counter-die or lower final shaping die 56.

The gathering operation is effected in the position of the coupling shown in Figs. 9 and 10. Then, the gathering die 47 is driven by means of the plunger 55, whereas the lower final shaping die or counter-die 56 will run idly. As shown in Fig. 9, the gathering depth extends beyond the depth of the finally desired cavity in the metal plate, shown in Fig. 9 by a dashed line below the metal plate 45.

Figure 11:
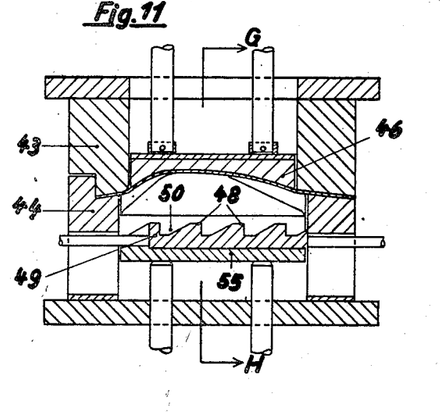
Fig. 11 shows a section according to Fig. 9 on line E—F of Fig. 12, but in the position in which the gathering die has been moved away out of the position of its gathering operation and in which it lies flush with the final shaping die.
Figure 12:
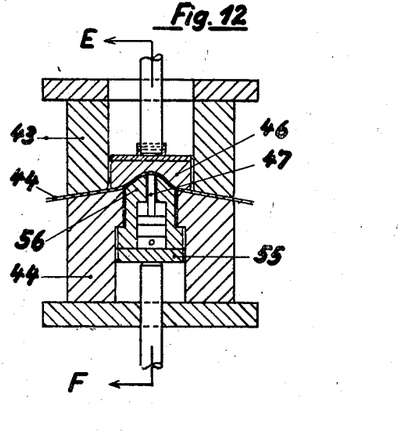
Fig. 12 shows a section on line G—H of Fig. 11.

For the final shaping or redrawing operation, the cross bar 49 is brought into the position shown in Figs. 11 and 12, in which the teeth 48 of the bar 49 engage the openings between the projections 50. The surface of the gathering die 47 will then be flush with the surface of the counter-die 56 so that, in the final shaping operation, the gathering die will form a part of the final shaping die. The height of the teeth 48 of the bar 49, therefore, corresponds to the depth of the gathering operation.

Now, the final shaping is effected by forcing down the counter-die or the matrix 46 into the position shown in Figs. 11 and 12, in which the metal plate will acquire its final shape.

Figures 13, 14, 15:
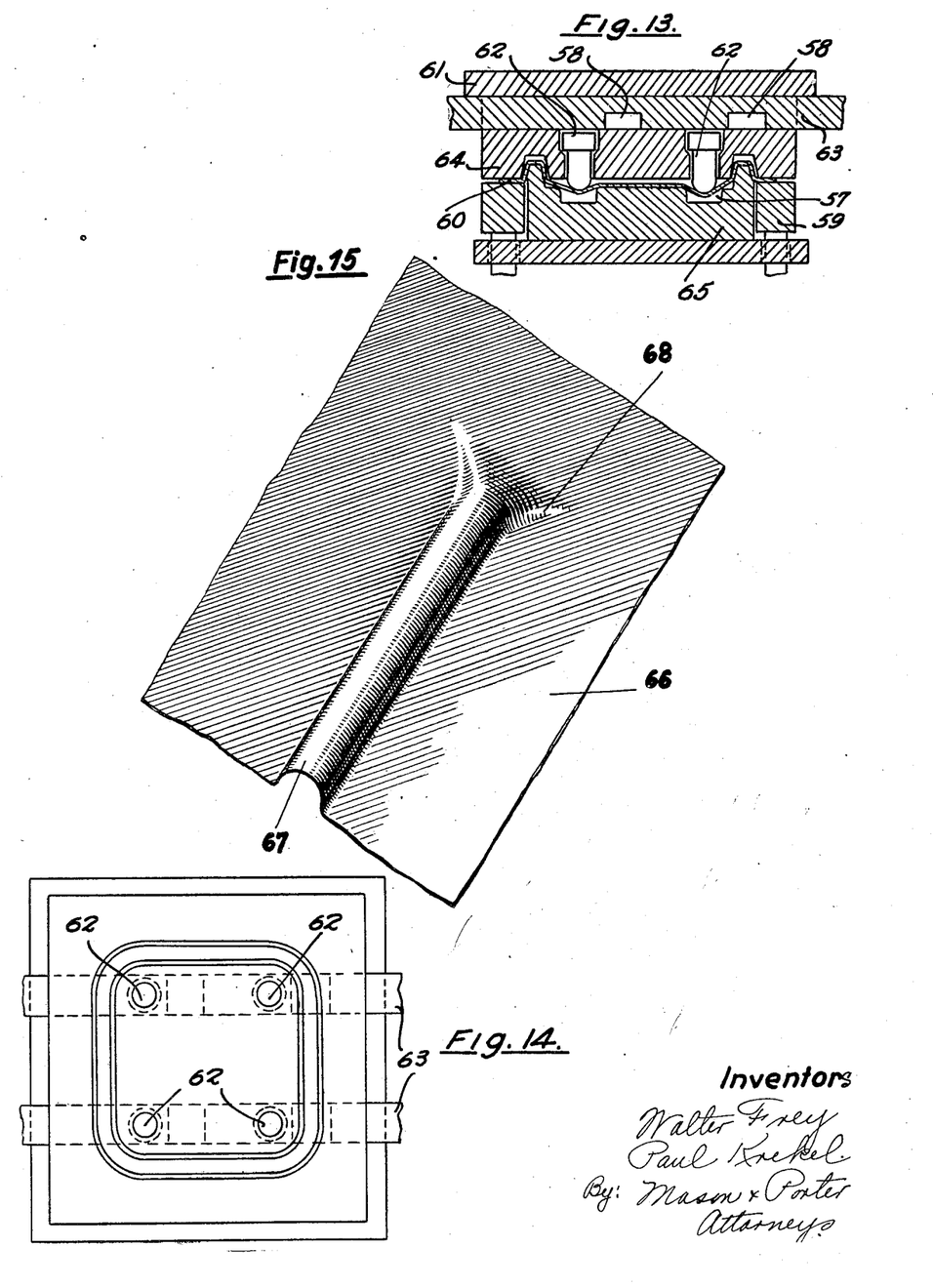
Fig. 13 shows a section according to Fig. 9 of a modified constructional form of a tool according to the invention with two gathering dies.
Fig. 14 is a view from below, of the upper tool die according to Fig. 13.
Fig. 15 shows a crease widening out, produced according to the invention.

In the constructional form shown in Figs. 13 and 14, in distinction from Figs. 9 to 12, not only one gathering die, but four gathering dies 62 are provided, which are mounted within the upper final shaping counter-die or drawing counter-die 61 so as to be shiftable in longitudinal direction. In this case, the gathering dies by their gravity acquire the operating position shown in Fig. 13 in which they form gathering depressions in the metal plate 60 at four places above the four recesses 57. In this operation, the metal plate is held by the work holder 64 connected with the upper drawing counter-die and by the lower movable work holder 59 connected with the lower drawing die or matrix 65. In the position of the gathering operation, the gathering dies are held by means of two cross bars 63 shiftable across the direction of drawing, bearing against the lower side of said bars. Each bar 63 has recesses 58 as large as or a little larger than the upper heads of the gathering dies 62.

In the final shaping, the bars 63 are shifted in their longitudinal direction by means of handles, not illustrated in the drawings, until the recesses 58 are exactly above the heads of the gathering dies 62 so that the latter may recede into the upper drawing counter-die by exactly the depth of the gathering and will be approximately flush with the surface of the upper drawing counter-die. Then the final shaping is effected by means of the lower final shaping die or the matrix 65 respectively, whereas the upper counter-die remains in its position shown in Fig. 13; in this position, the lower final shaping die will bear with its entire surface against the work piece. The shifting of the bars may also be effected by a driving power, for example hydraulically.

The construction of the tool according to the invention is, of course, not restricted to the above mentioned numbers of gathering dies, nor to the methods described by way of example, although the latter have proved to be particularly advantageous. In addition, when being mounted in the press, according to the construction of the press, the parts described as upper tool parts may be used at the bottom, whereas the parts described as lower tool parts may be used at the top. Instead, the tool parts may, for example, be all placed edgewise in a horizontal press in such a way that the drawing operation is effected substantially in horizontal direction.

The gathering die or gathering dies preferably have a small width with respect to the matrix, and a surface or operating surface whose horizontal projection is considerably smaller than the horizontal projection of the operating surface of the matrix. Preferably, the horizontal projection of the recess provided in the matrix is also smaller than the total operating surface of the matrix, but corresponding to the horizontal projection of the counter-die.

In the above description, the terms "counter-die," "die" or "matrix" were used merely for the sake of clearness, in order to distinguish the one shaping die from the counter-shaping die. These terms are, however, merely preferred but not absolutely conclusive for association with the gathering die or the gatheing dies or for association with a fixed or a movable work holder. If desired, this association may, for example, be varied so that the gathering die or the gathering dies are mounted so as to be shiftable in longitudinal direction within the matrix, in which case they will have to move comparatively far before this matrix in the gathering operation, and the counter-die, in redrawing, will change the form of the metal plate, for example, from an upright V into a reversed V, and will finally shape the desired cavity, whereas the matrix will perform the corresponding counter-motion.

The tools described or the press described may be used with advantage for producing a comparatively deep oblong cavity in a metal plate by pressing or drawing operations. Such pressing according to the invention is to prevent the formation of folds, which occurs with the hitherto pointed shape of the widening of the cavity or crease owing to the accumulation of material. This formation of folds is prevented according to the invention by providing the oblong cavity in the drawing operation with a widening considerably increasing in width, as shown in Fig. 15.

In Fig. 15, 67 designates a crease, produced in a metal plate 66 by pressing or drawing, with a broad widening 68.

Such creases are required principally in metal plate constructional parts for the construction of aircrafts, in which also all other above mentioned constructions according to the invention are employed with special advantage.

What we claim is:

1. In a press structure of the character described, upper and lower opposed work holders having a central opening therebetween, a counter-die and a die operable in opposed relation in said opening, means for forcing and holding said work holders for edge-securing a plate therebetween, means for operating the counter-die, a stationary bolster opposing the lower work holder, a movable carriage opposing the upper work holder, a fluid pressure cylinder and piston equipment connected with the carriage in position for pushing said carriage against the work holder which it opposes, and a fluid pressure cylinder and piston equipment connected with the carriage in position for pulling said carriage against the work holder which it opposes.

2. In a press structure of the character described, upper and lower opposed work holders having a central opening therebetween, a counter-die and a die operable in opposed relation in said opening, means for forcing and holding said work holders for edge-securing a plate therebetween, means for operating the counter-die, a stationary bolster opposing the lower work holder, a movable carriage opposing the upper work holder, a fluid pressure cylinder and piston equipment connected with the carriage in position for pushing said carriage against the work holder which it opposes, and a fluid pressure cylinder and piston equipment connected with the carriage in position for pulling said carriage against the work holder which it opposes, means operatively connecting said last named fluid pressure cylinder and piston equipment with said die for imparting movement thereto, and means for locking said last named connecting means against movement so as to render said last named cylinder and piston equipment effective only to augment the other cylinder and piston equipment in forcing and holding the work holders together, said locking means being releasable to render said last named cylinder and piston equipment additionally effective to impart movement to said die.

3. A press structure as defined in claim 2 in which said die and cylinder and piston equipment operative connection includes a slide opposed to and spaced below said bolster and having a plunger projected upwardly therefrom for engagement with said die and a plunger connection with a part of said last named cylinder and piston equipment, and said locking means comprising stop blocks projectable between and retractable from between said bolster and slide.

4. A press structure as defined in claim 2 in which said die and cylinder and piston equipment operative connection includes a slide opposed to and spaced below said bolster and having a plunger projected upwardly therefrom for engagement with said die and a plunger connection with a part of said last named cylinder and piston equipment, and said locking means comprising stop blocks projectable between and retractable from between said bolster and slide, and in which are included fluid pressure cylinder and piston equipments for effecting the projection and retraction of said stop blocks.

5. In a press structure of the character described, opposed work holders for clamping a plate therebetween secure against edge movement during initial prestretching and subsequent shape finishing operations on said plate, said holders having a central opening therebetween, a die and a counter-die opposed within said opening and one having a shaping cavity therein and the other having a shaping projection receivable in said die cavity, a prestretching element carried by said other die and projectable from and retractable into the shaping projection, and means for securing the element in projected position so that it can be moved with said other die to effect a prestretching of a clamped plate to form a cavity therein greater than is finally desired, said element being retractable following the prestretching of the plate so that the dies can then be brought together to finish the plate shaping between said shaping cavity and projection.

6. A structure as defined in claim 5 in which said element projection securing means includes a slide movable relative to said element, said element and said slide having complementary cam portions engageable for effecting projection of the element and a securing of said projection when moved in one direction and a release of said projection securing to permit retraction of said element projection when moved in the opposite direction.

7. In a press and tool structure for forming cavities in metal plates, opposing work holders, means for forcing and holding the work holders together with a metal plate between them during the entire process of forming and finishing a cavity so as to prevent edge movement in said plate, one of said work holders having a central opening therein, a counter-die shiftable within said opening, a die having a greater total operating surface than the counter-die and shiftable in said opening, the operating surface of the die having a recess corresponding to the counter-die, the horizontal projection of which recess is considerably smaller than the horizontal projection of the total operating surface of the die, means operable after the plate has been clamped by the work holder for effecting relative movement between the counter-die and the work holder having the center opening to cause the counter-die to prestretch the edge-secured-plate into said center opening to form a bulge therein which is of different dimensions than the ultimately desired cavity and for thereafter forcing the die toward the counter-die to finish the formation of the plate cavity between them, a stationary bolster opposing one of said work holders, a movable carriage opposing the other work holder, means for operating said parts including hydraulic equipment connected with the carriage in position for pushing said carriage against the work holder which it opposes, and hydraulic equipment connected with the carriage in position for pulling said carriage against the work holder which it opposes.

8. In a press and tool structure for forming cavities in metal plate, opposing work holders, means for forcing and holding the work holders together with a metal plate between them during the whole process of forming and finishing a cavity so as to prevent edge movement in said plate, one said work holder having a central opening therein, a counter-die shiftable within said opening, a die having a greater total operating surface than the counter-die and shiftable in said opening, the operating surface of the die having a recess corresponding to the counter-die the horizontal projection of which recess is considerably smaller than the horizontal projection of the total operating surface of the die, means operable after the plate has been clamped by the work holders for effecting relative movement between the counter-die and the work holder having the center opening to cause the counter-die to prestretch the edge-secured plate into said center opening to form a bulge therein which is of larger dimensions than the ultimately desired cavity and for thereafter forcing the die toward the counter-die to finish the formation of the plate cavity between them while maintaining the secure clamping engagement of the work holders with the plate edges, a stationary bolster opposing one of said work holders, a movable carriage opposing the other work holder, a fluid pressure cylinder and piston equipment connected with the carriage in position for pushing said carriage against the work holder which it opposes, and a fluid pressure cylinder and piston equipment connected with the carriage in position for pulling said carriage against the work holder which it opposes, means operatively connecting said last named fluid pressure cylinder and piston equipment with said recessed die for imparting movement to said recessed die, and means for locking said last named connecting means against movement during prestretching of the plate so as to render the last named fluid pressure cylinder and piston equipment effective only to augment the other cylinder and piston equipment in forcing and holding the work holders together, said locking means being releasable following said prestretching of the plate to render said last named cylinder and piston equipment additionally effective to impart movement to said recessed die.

WALTER FREY.
PAUL KREKEL.